United States Patent [19]

Cooper et al.

[11] Patent Number: 5,774,793
[45] Date of Patent: Jun. 30, 1998

[54] SYSTEM AND METHOD FOR INTERFACING DIVERSELY CONTROLLED DEVICES TO A BUS CONNECTOR HAVING A COMMON SIGNAL FORMAT

[75] Inventors: Gershon N. Cooper, Encino; Andrew Holman, West Hills, both of Calif.

[73] Assignee: ORA Electronics, Inc., Chatsworth, Calif.

[21] Appl. No.: 361,985

[22] Filed: Dec. 22, 1994

[51] Int. Cl.$^6$ .................................................. H04B 1/38
[52] U.S. Cl. ......................... 455/89; 455/345; 455/127; 379/59; 439/502; 439/955
[58] Field of Search .............................. 455/89, 90, 127, 455/128, 344, 345, 346, 347, 348, 349, 350, 351, 33.1; 379/58, 59, 63, 441, 442; 439/502, 638, 505, 955

[56] References Cited

U.S. PATENT DOCUMENTS

| | | | |
|---|---|---|---|
| 4,876,712 | 10/1989 | Brint et al. ........................... | 439/955 |
| 4,972,470 | 11/1990 | Farago .................................. | 439/955 |
| 5,249,218 | 9/1993 | Sainton ................................ | 379/58 |
| 5,333,177 | 7/1994 | Braitberg et al. ..................... | 379/58 |
| 5,418,836 | 5/1995 | Yazaki .................................. | 379/58 |
| 5,479,479 | 12/1995 | Braitberg et al. ..................... | 379/59 |

*Primary Examiner*—Reinhard J. Eisenzopf
*Assistant Examiner*—Doris To
*Attorney, Agent, or Firm*—Matthew F. Jodziewicz

[57] ABSTRACT

A system for connecting a plurality of cellular telephones, each responsive to device-specific command signals for its operation, to an automotive electronics and communications system through a bus connector having a known universal signal format, includes a docking station having a cradle member shaped for receiving at least one cellular telephone. An interface unit contains the hardware and firmware drivers necessary for controlling the selected cellular telephone. A user selected cable having a specific signal path configuration selects the needed drivers. A second cable connects the interface unit with the bus connector for communicating signals therebetween.

42 Claims, 4 Drawing Sheets

SYSTEM AND METHOD FOR INTERFACING DIVERSELY CONTROLLED DEVICES TO A BUS CONNECTOR HAVING A COMMON SIGNAL FORMAT

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates in general to a universal data interface system and a method which can be used to interface a variety of devices having different control and command formats to a bus having a known universal signal format.

2. Known Prior Art

Previously, automotive interfacing systems for interfacing radiotelephone access devices such as cellular telephones to a vehicle's internal electronics and communications system, were designed to accommodate a single access device, i.e., not only one brand of cellular telephone, but a single model within the brand of cellular telephone, a dedicated interfacing system. The reason for this limitation is that each and every access device requires different interface hardware and protocol software or firmware that is specific to the particular access device.

With the increased popularity of cellular telephones, the proposed standard universal bus connector to the automotive electronics and communications system, and safety laws being promulgated to regulate the use of cellular telephones in moving vehicles, it has become necessary to develop a method and an interfacing system by which a single system having modular components can be used to enable the interface system installer and cellular user as well, to just plug the cellular telephone into the interface system, and have the device work without the user having to manually change switch settings or load or unload software into the device for operation with the specific cellular telephone.

There are no known prior art automotive interfacing systems utilizing both the modular and cable selecting approach of the present invention. The closest known prior art interface units usually include a microprocessor, a memory device for storing the protocol for a particular cellular telephone unit that the device is designed to work with, and associated device specific hardware for connecting the interface unit to the designated cellular telephone. These devices then require that a wide range of interface units be manufactured and that an appropriate interface unit be selected for a given cellular telephone that is to be interfaced with the particular system. The cost of manufacturing such a wide variety of mutually exclusive interfacing units is prohibitive in many instances for both the automotive manufacturer and the installer who is forced to carry a large inventory of interfacing units to cover the wide number of potential cellular telephones that a customer may own.

Contrary to this, the present invention contains all related interface protocol firmware or software in its non-volatile memory as well as hardware modules for a number of different make and models of cellular telephones. The appropriate firmware and hardware drivers are selected by the user choosing a cable specifically designed to mate with the particular model and make of cellular telephone. This cable preferably terminates in a standard multiple pin connector, such as a 25 pin D-type subminiature connector. The "telephone" side of the cable is connected to the appropriate cellular telephone Input/Output port pins. By shorting known pins in the cable in a selected manner, the appropriate interface firmware and hardware drivers are selected from those held in the unit.

The modular docking station is then, along with the device specific cable described below, are the only items that need be manufactured specifically for a particular make and model of cellular telephone, as the remaining components are universal. This arrangement provides for ease of manufacture and updating the system to accommodate new models and makes of cellular telephones, as well as changes to the command signal structure of existing cellular telephones and devices.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

With reference to the accompanying drawings in FIGS. 1 to 4, a preferred embodiment of the invention is now described.

Figure 1:
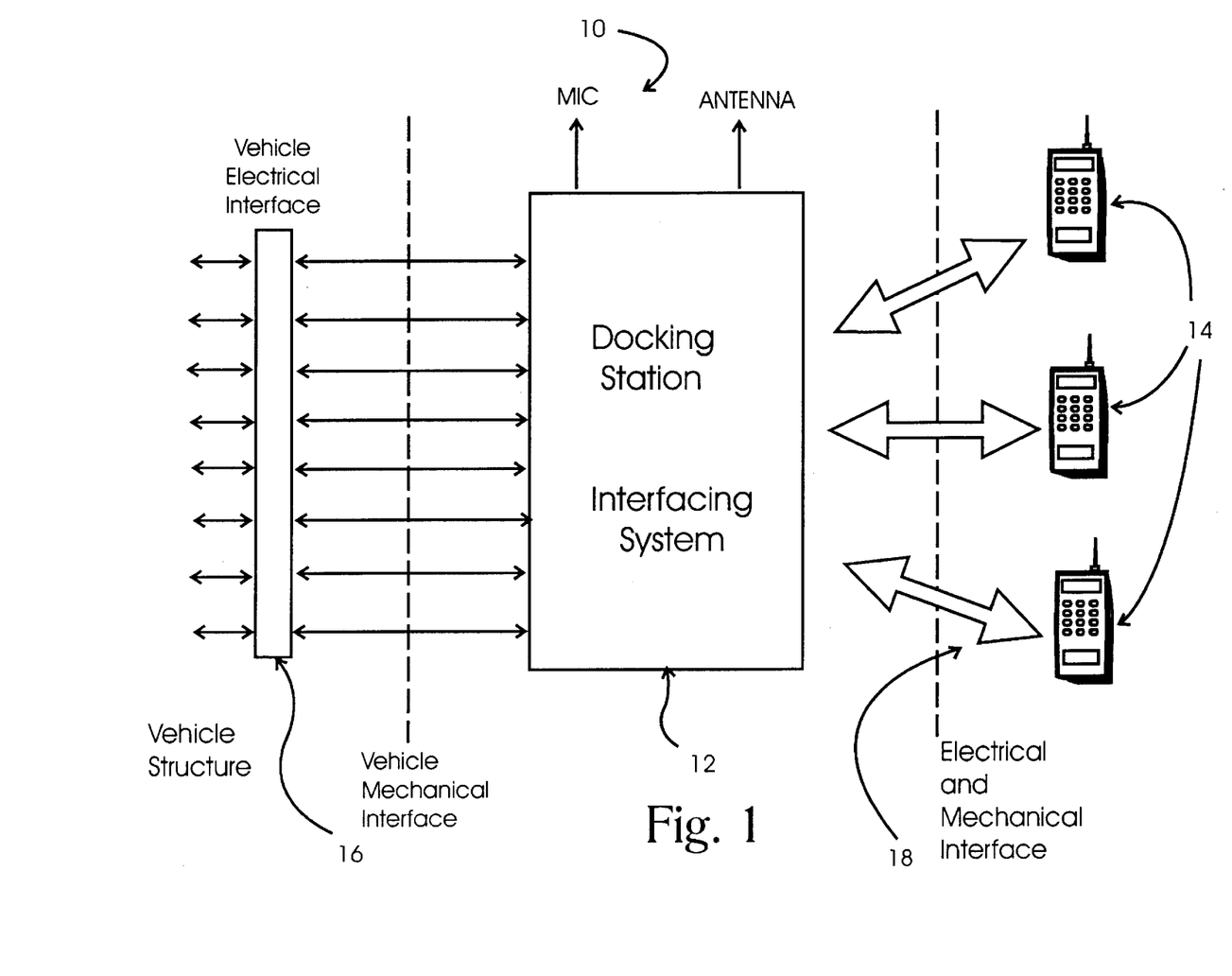
FIG. 1 is an idealized diagram of a system embodying the present invention for connecting a cellular telephone to an automotive electronics and communications system through a bus connector having a known universal signal format.

FIG. 1 shows an idealized diagram of a system 10 embodying the present invention including a docking station 12 for connecting a variety of cellular telephones 14, each responsive to device-specific command signals for its operation, to an automotive electronics and communications system through a vehicle electrical interface accessed through a bus connector 16 having a known universal signal format.

Docking system 12 acts to interface the cellular telephones 14 to the automotive electronics and communications system, by providing an acceptable electrical and mechanical interface 18 between the various makes and models of cellular telephones 14 and the docking station 12 itself on the one hand, and across a vehicle mechanical interface 20 on the other hand to enable various types of cellular devices to communicate through the standard format bus connector 16.

Figure 2:
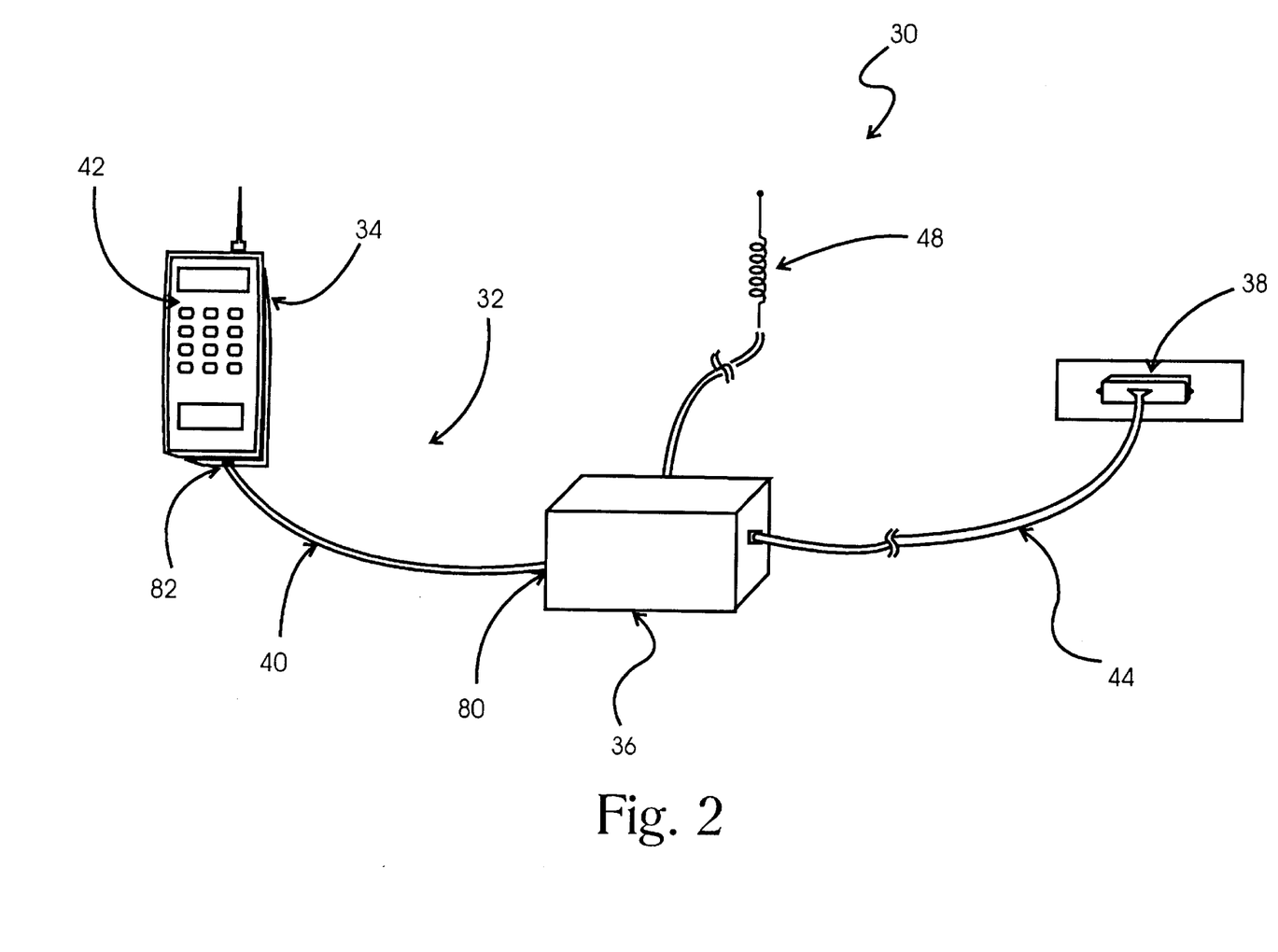
FIG. 2 is a diagram of a system embodying the present invention showing the component blocks of such a system.

Likewise, FIG. 2 illustrates an interfacing and docking system 30 embodying the present invention showing the component blocks of such a system as shown in block form in FIG. 1.

A docking station 32 has a cradle member 34 shaped for receiving and releasably retaining at least one make and model of cellular telephones therein. While one cradle member 34 may be capable of holding more than one cellular telephone, it is understood that a number of such cradle members may be necessary to accommodate all of the variously shaped cellular telephones currently available.

An interface unit 36, which may be either separate from or incorporated into cradle member 34, is provided for processing data transferable over a selected cellular telephone. Interface unit 36 operates in accord with an interface data control program, and further has a plurality of hardware and firmware drivers. These drivers have, respectively, the operating circuitry and commands necessary for controlling the selected cellular telephone. The interface data control program operates in accord with a specific signal path configuration, as described below, to select a desired one pair of hardware and firmware drivers.

The interface control program further has universal bus connector hardware and firmware drivers having, respectively, the operating circuitry and commands necessary for operating in accord with signals received from the bus connector 38 in the known universal signal format.

A first external signal path cable 40 connects the interface unit 36 with the selected cellular telephone 42 for communicating control signals therebetween for controlling and/or monitoring the operation of the selected cellular telephone 42. Cable 40 also has a selected signal path configuration chosen from a plurality of such configurations. Each configuration is adapted to select at least one pair of hardware and firmware drivers having, respectively, the operating circuitry and commands necessary for controlling the selected cellular telephone 42 to communicate command signals over cable 40 in response to the pair of hardware and firmware drivers selected to permit the control of cellular telephone 42.

A second cable 44 connects interface unit 36 and bus connector 38 for communicating signals therebetween. The configuration of this cable 44 is compatible with the universal or standard pinout signal format of bus connector 38.

The preferred embodiment of the present invention includes circuitry for generating and applying a signal to bus connector 38 that is useful for controlling other devices connected to the automotive electronics and communications system based upon the status of cellular telephone 42. One non-limiting example is that these signals can be used to control a muting function on any radio or the like device connected to the automotive electronics and communications system.

Additional preferred circuitry include a voice recognition circuit capable of receiving a user generated audio voice command and generating an electrical signal to control the cellular telephone or other device connected to the automotive electronics and communications system such as door locks, lights and the like.

Also, a speech generation circuit can be connected to the invention to echo the voice commands of the user to provide the user with a positive audio feedback to confirm the instructions being sent via the electronic signal of the voice recognition system. This is a safety feature for the moving motorist. Specifically, if voice recognition and speech generation circuits are combined in the present invention, a user can vocalize a command and continue to concentrate on driving while he listens for the audio confirmation of his command. Thus he need never take his eyes off of the road.

Another safety feature to complement or substitute for the foregoing circuits is to include a visual display device, such as a LCD screen in a visually convenient location, such as in the control panel or on the steering column or wheel, for the driver so that he need not remove his eyes from the roadway to search for the status or display information normally shown on the display of a cellular telephone.

The present invention can also include circuitry for passing the audio output signal of the cellular telephone to the bus connector and thus to the automotive electronic and communications system. The audio output of the cellular telephone can then be heard over the automobile's speaker system. Likewise, an external microphone can be located in the vehicle's passenger compartment and a circuit can supply an audio signal to the audio input of the cellular telephone for permitting a user to keep his hands on the wheel while using the cellular telephone for safety reasons.

Likewise, the preferred embodiment of the present invention also includes circuitry for receiving a power signal from the bus connector 38 and applying the power signal to cellular telephone 42 for charging the cellular telephone 42 when it is connected to the automotive electronics and communications system through bus connector 38 thereby providing an additional safety and convenience feature by maintaining the cellular telephone 42 in a fully charged state for use.

System 30 may also include cable connections 46 for connecting the cellular telephone 42 to an external antenna 48.

Figure 3:
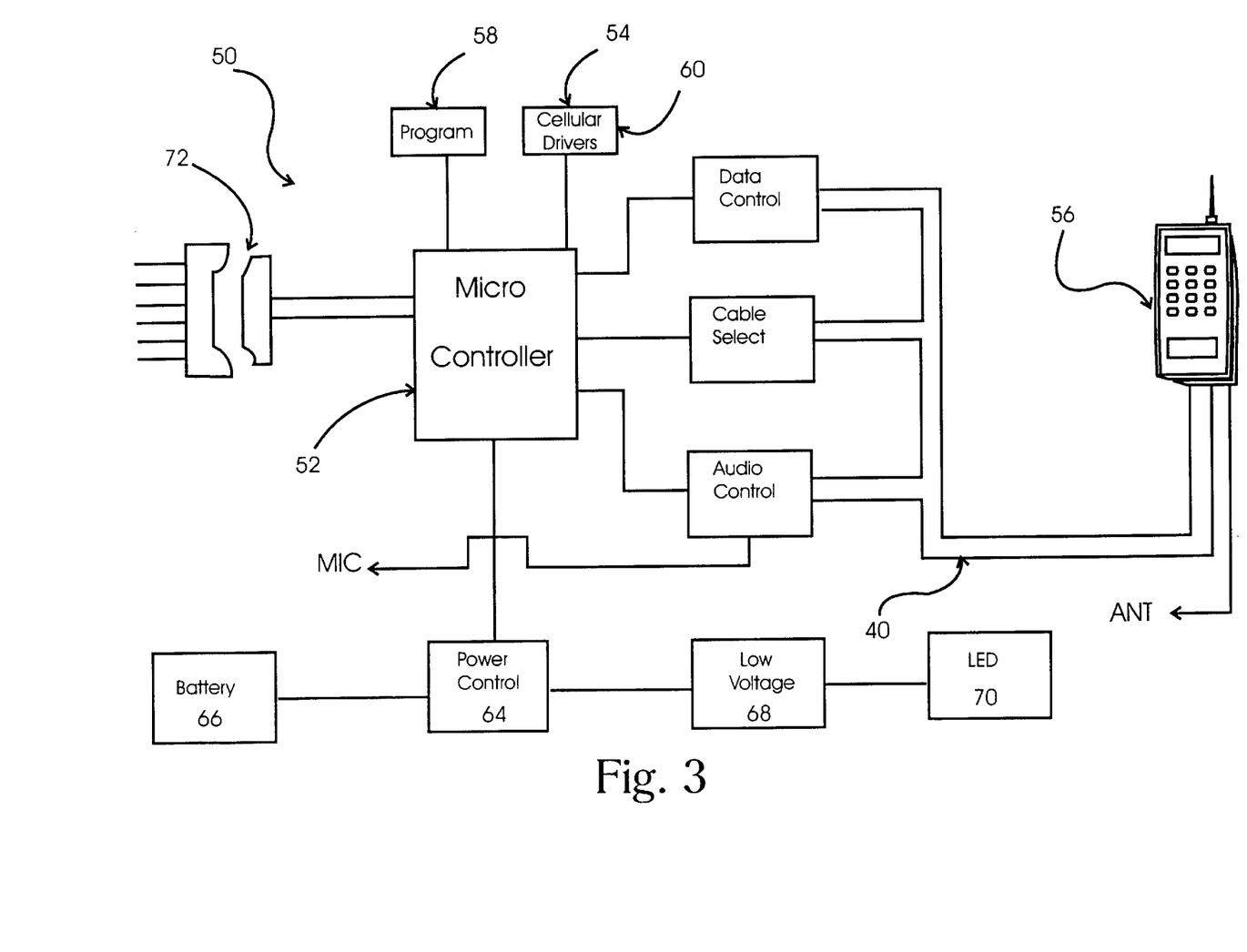
FIG. 3 is a block diagram of a system embodying the present invention expanding the microcontroller operating component block shown in FIG. 2; and, FIG. 4 is a block diagram of a system embodying the present invention expanding the microcontroller operating component block shown in FIG. 3 and its relationship with various firmware modules.
Figure 4:
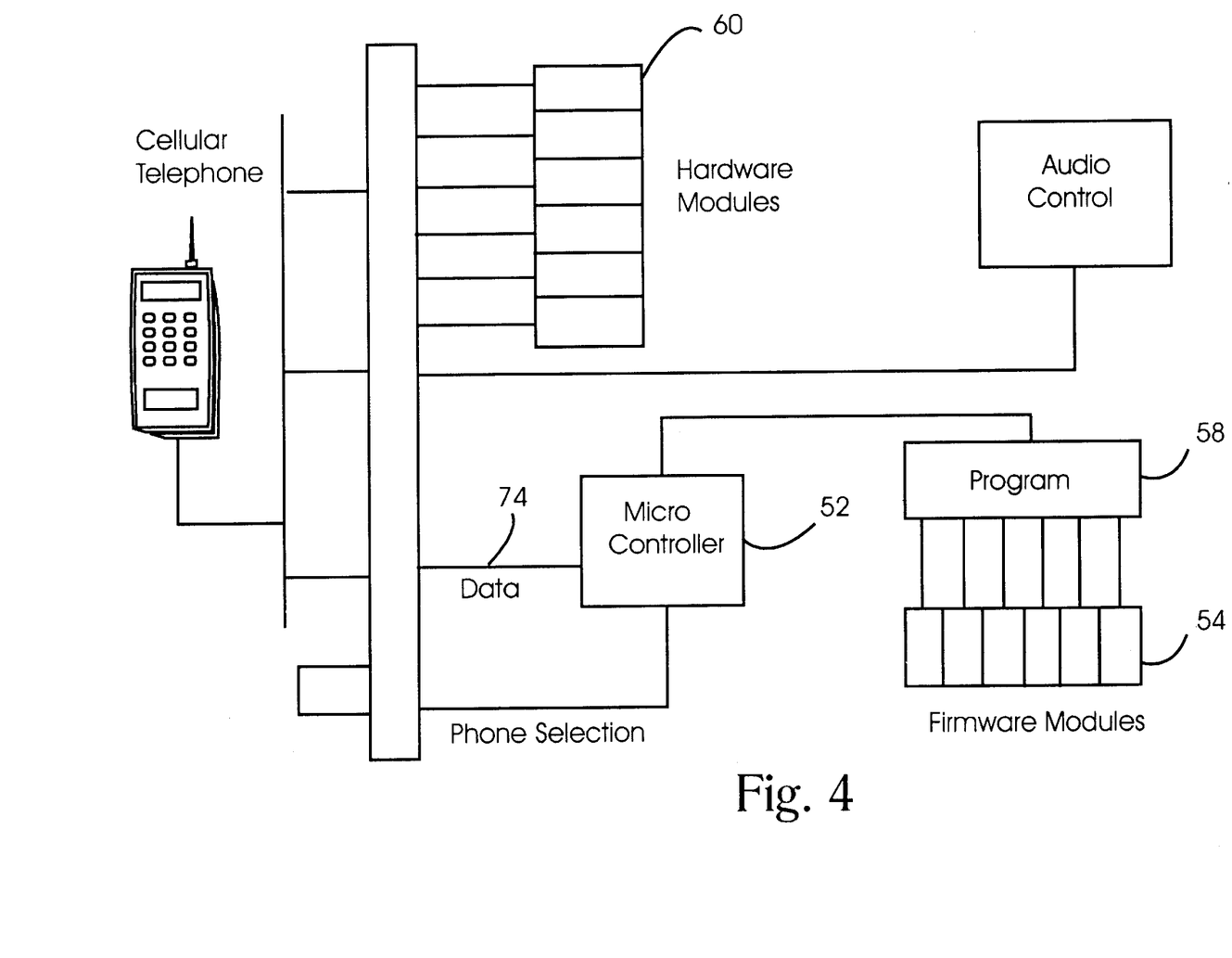

As shown in FIG. 3, interface device 50 includes a microcontroller 52 which contains, in its non-volatile memory, a data control program having a plurality of firmware drivers or modules 54 shown in FIG. 4. Firmware drivers 54 have the operating commands necessary for controlling cellular telephone 56. Data control program 58 operates in accord with a specific signal path configuration as described further below to select a desired one of the firmware and hardware interface drivers 54, 60 respectively, that are specific for the particular cellular telephone 56 being used with the interface unit 50.

As shown in FIGS. 2 to 4, the selection of a specific signal path configuration is accomplished by the user choosing a specific external cable 40 connecting the interface device 36 with the selected cellular telephone 42. Cable 40 provides an external signal path for communicating control signals between interface device 36 and cellular telephone 42 for controlling the operation of cellular telephone 42.

Preferably, a multi-line external cable is used in the system of the present invention. The cable has a first jack connector at one end 80 compatible with an Input/Output port of the interface device 36 and a second jack connector compatible with the input/output plug on the selected cellular telephone 42 at another end 82 of cable 40 for operably connecting the second jack connector to the input/output port found on each cellular telephone.

Each jack connector has its pins configured to provide external signal connection paths as required to operably connect the particular make and model of cellular telephone 42 with the interface device 36 so as to select one pair of firmware and hardware interface drivers 54, 60 respectively. The selected drivers have the operating commands and hardware circuitry necessary for controlling the particular make and model of cellular telephone 42 to communicate command signals over the cable lines in response to the selected drivers to permit the control of call placement functions for a particular make and model of cellular telephone.

One example of a preferred cable 40 has on a first end 80 a first connector, such as a 25 pin D-type subminiature connector, adapted to mate with an Input/Output port of the interface device 36, and, on a second end 82 a second connector adapted to mate with the selected cellular telephone 42.

In operation, the user selects a specific cable 40 having the appropriate connector plugs for his particular make and model of cellular telephone 42, and connects the two units.

One preferred method of selecting the selected signal path configuration of cable 40, is to provide a plurality of cables, each one having a pin in and pin out configuration that shorts and crossed individual pins to provide a specific signal connection path between interface device 36 and cellular telephone 42. Each of the cables is then labeled as to which particular make and model of cellular telephone it is to be used with. Thus, the user chooses the appropriate cable 40 to mate with a particular make and model of cellular telephone 42 from a plurality of such cables having varying pin in/pin out configurations. Each cable configuration is adapted to select one of the interface drivers that has the operating commands necessary for controlling the selected make and model of cellular telephone 42. With the appropriate cable 40, command signals are communicated over external cable 40 in response to the selected interface drivers to permit the control of call placement functions for the make and model of cellular telephone 42.

Microcontroller 52 automatically selects the required cellular telephone protocol needed to interface with the particular make and model of cellular telephone 56 based upon the user's selection of a cable 40 configured to a specific make and model of cellular telephone, and cable selection circuitry 60 as described above.

Microcontroller 52 also controls system power automatically by means of power control circuitry 64 which monitors the voltage level of battery 66 and indicates by means of low voltage circuitry 68 and a visual display, such as LED 70, whenever the voltage level of battery 66 falls below a preselected level. Power control circuitry 64 may also obtain a power signal from connector bus 72 for charging the cellular telephone 56 while it is connected to interfacing system 50.

The method that the system utilizes in selecting the appropriate cellular telephone interface will now be discussed.

Cellular telephones differ from one another based upon the operating specifications of the manufacturer of the particular unit. Each cellular telephone has different mechanical connectors, audio circuits, communication protocols, and individual special command signal requirements specific to the unit's operation. To accommodate these different hardware and firmware interfaces, the system user of the present invention selects a cable from a series of cables provided him that interfaces a specific cellular telephone unit with the system of the present invention. Once plugged in, the cable pinout wiring automatically indicates and selects the internally stored hardware and firmware needed to properly interface the system of the present invention with the specific cellular telephone unit. Thus, the user is provided with a plurality of interconnect cables which are designed specifically for each model of cellular telephone. However, once the user selects the appropriate cable for the particular cellular telephone used with the system, the system then automatically selects, based on the cable wiring, the particular cellular telephone interface hardware and firmware modules necessary. This automatic selection mechanism is now described.

The interconnect cable 40 connects to specific hardware modules 60 that meet the hardware requirements of the particular cellular telephone 56. The user is provided with a number of interconnect cables 40 that are each designed to interface a specific cellular telephone with system 50 through a standard connector such as an RS232 standard or the like connector. The pinout wiring on each cable 40 interacts with cable select circuitry 62 to select and activate a particular one of several hardware modules 60 and one of several firmware modules 54, all contained in system 50. Once the appropriate hardware and firmware interface modules are selected and activated, firmware module 54 communicates with the microcontroller 52 in the cellular telephone specific protocol for the selected cellular telephone unit by means of data line 74.

The present invention is also embodied in a method of connecting a computer device for data transmission over a telephone network which can be accessed through a plurality of telephone network access devices responsive to device-specific command signals to perform a network accessing function. The preferred method includes the steps of:

(a) providing a docking station having a cradle member shaped for receiving and releasably retaining at least one cellular telephone therein;

(b) providing an interface unit having a plurality of hardware and firmware drivers having, respectively, the operating circuitry and commands necessary for controlling the selected cellular telephone. The interface data control program operating in accord with a specific signal path configuration to select a desired one pair of the hardware and firmware drivers, and further having universal bus connector hardware and firmware drivers having, respectively, the operating circuitry and commands necessary for operating in accord with signals received from the bus connector in the known universal signal format;

c) connecting the interfacing unit with the selected cellular telephone by a first external signal path means for communicating signals therebetween for controlling and/or monitoring the operation of the selected cellular telephone;

d) selecting a first external signal path cable with a selected signal path configuration from a plurality of such configurations, each configuration adapted to select one pair of hardware and firmware drivers having, respectively, the operating circuitry and commands necessary for controlling the selected telephone network access device, to communicate command signals over the first external signal path cable in response to the pair of hardware and firmware drivers selected, to permit the control of the selected cellular telephone;

(e) providing a second external signal path cable connecting the interface unit and the bus connector for communicating signals therebetween.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A system for connecting a plurality of cellular telephones, each responsive to device-specific command signals for its operation, to an automotive electronics and communications system through a bus connector having a known universal signal format, comprising:

(a) interface means for processing data transferable over a selected cellular telephone, and operating in accord with an interface data control program, said interface means further having a plurality of hardware and firmware drivers having, respectively, the operating circuitry and commands necessary for controlling the selected cellular telephone, said interface data control program operating in accord with a specific signal path configuration to select a desired one pair of said hardware and firmware drivers, said interface control program further having universal bus connector hardware and firmware drivers having, respectively, the operating circuitry and commands necessary for operating in accord with signals received from the bus connector in the known universal signal format;

(b) first external signal path means connecting said interface means with the selected cellular telephone for communicating control signals therebetween for controlling and/or monitoring the operation of the selected cellular telephone, said first external command signal path means further having a selected signal path configuration chosen from a plurality of such configurations, each configuration adapted to select one pair of said hardware and firmware drivers having, respectively, the operating circuitry and commands necessary for controlling the selected cellular telephone to communicate command signals over said first external command signal path means in response to said selected pair of hardware and firmware drivers to permit the control of the selected cellular telephone;

(c) second external signal path means connecting said interface means and the bus connector for communicating signals therebetween;

(d) means for generating and applying a signal to the bus connector that is useful for controlling other devices connected to the automotive electronics and communications system based upon the status of the selected cellular telephone; and, (e) means for receiving a power signal from the bus connector and applying said power signal to the selected cellular telephone for charging the selected cellular telephone.

2. A system as in claim 1 wherein said means for generating and applying a signal to the bus connector that is useful for controlling other devices connected to the automotive electronics and communications system based upon the status of the selected cellular telephone comprises, means for generating a signal useful to mute a radio connected to the automotive electronics and communications system.

3. A system as in claim 1 further comprising a docking station having means for connecting the selected cellular telephone to an external antenna.

4. A system as in claim 3 wherein said docking station has a plurality of cradle members, each being shaped for receiving and releasably retaining at least one of the plurality of cellular telephones therein.

5. A system as in claim 1 wherein said first external signal path means comprises a cable having on a first end a first connector adapted to mate with an Input/Output port of said interface means and, on a second end, a second connector selected by a user and adapted to mate with the selected cellular telephone.

6. A system as in claim 5 wherein said first connector is a multiple pin connector.

7. A system as in claim 6 wherein said multiple pin connector is a 25 pin D-type subminiature connector.

8. A system as in claim 1 wherein said first external signal path means comprises a multi-line cable means having a first jack means at one end thereof compatible with an Input/Output port of said interface means and a second jack means compatible with the selected cellular telephone at another end thereof for operably connecting said second jack means to the selected cellular telephone;

said first and second jack means each connected to the cable lines to provide a configuration at each jack means for providing external signal connection paths as required to operably connect the selected cellular telephone with said interface means to select one pair of said hardware and firmware drivers having, respectively, the operating circuitry and commands necessary for controlling the selected cellular telephone to communicate signals over said cable lines in response to said selected pair of hardware and firmware drivers to permit the control of the selected cellular telephone.

9. A system as in claim 8 wherein said first and second jack means are multiple pin connectors.

10. A system as in claim 9 wherein at least one of said multiple pin connectors is a 25 pin D-type subminiature connector.

11. A system as in claim 1 wherein said interface means further includes memory means and said firmware drivers are retained in said memory means.

12. A system as in claim 1 wherein said memory means are non-volatile memory means.

13. A system as in claim 1 wherein said means for generating and applying a signal to the bus connector that is useful for controlling other devices connected to the automotive electronics and communications system based upon the status of the selected cellular telephone comprises, means, connected to the cellular telephone and to the bus connector, for generating a signal useful for passing the audio output of the cellular telephone to the automotive electronics and communications system.

14. A system as in claim 1 further including means, remote from but connected to said interface means through the bus connector, for generating a signal to control the cellular telephone.

15. A system as in claim 14 wherein said means for generating a signal to control the cellular telephone further comprises:

speech recognition circuit means for generating an electrical signal representative of a user spoken command for controlling the cellular telephone.

16. A system as in claim 14 wherein said means for generating a signal to control the cellular telephone further comprises:

speech generation circuit means for generating an audio speech signal representative of said electrical signal generated to control the cellular telephone.

17. A system as in claim 1 further including means, connected to the cellular telephone, for displaying the status and the display information of the cellular telephone to a user.

18. A system as in claim 1 further including:
a docking station having a cradle member shaped for receiving and releasably retaining at least one of the plurality of cellular telephones therein.

19. A system for connecting a plurality of cellular telephones, each responsive to device-specific command signals for its operation, to an automotive electronics and communications system through a bus connector having a known universal signal format, comprising:

(a) interface means for processing data transferable over a selected cellular telephone and operating in accord with an interface data control program, said interface means further having a plurality of hardware and firmware drivers having, respectively, the operating circuitry and commands necessary for controlling the selected cellular telephone, said interface data control program operating in accord with a specific signal path configuration to select a desired one pair of said hardware and firmware drivers, said interface control program further having universal bus connector hardware and firmware drivers having, respectively, the operating circuitry and commands necessary for operating in accord with signals received from the bus connector in the known universal signal format said interface means further comprises means for generating and applying a signal to the bus connector that is useful for controlling other devices connected to the automotive electronics and communications system based upon the status of the selected cellular telephone that further includes means for generating a signal useful to mute a radio connected to the automotive electronics and communications system;

(b) first external signal path means connecting said interface means with the selected cellular telephone for communicating control signals therebetween for controlling and/or monitoring the operation of the selected cellular telephone, said first external command signal path means further having a selected signal path configuration chosen from a plurality of such configurations, each configuration adapted to select one pair of said hardware and firmware drivers having, respectively, the operating circuitry and commands necessary for controlling the selected cellular telephone to communicate command signals over said first external command signal path means in response to said selected pair of hardware and firmware drivers to permit eh control of the selected cellular telephone;

(c) second external signal path means connecting said interface means and the bus connector for communicating signals therebetween.

20. A system as in claim 19 further including:
a docking station having a cradle member shaped for receiving and releasably retaining at least one of the plurality of cellular telephones therein.

21. A system as in claim 19 wherein said interface means further comprises:
means for receiving a power signal from the bus connector and applying said power signal to the selected cellular telephone for charging the selected cellular telephone.

22. A system as in claim 19 further comprising a docking station having means for connecting the selected cellular telephone to an external antenna.

23. A system as in claim 19 wherein said first external signal path means comprises a cable having on a first end a first connector adapted to mate with an Input/Output port of said interface means and, on a second end, a second connector selected by a user and adapted to mate with the selected cellular telephone.

24. A system as in claim 23 wherein said first connector is a multiple pin connector.

25. A system as in claim 24 wherein said multiple pin connector is a 25 pin D-type subminiature connector.

26. A system as in claim 19 wherein said first external signal path means comprises a multi-line cable means having a first jack means at one end thereof compatible with an Input/Output port of said interface means and a second jack means compatible with the selected cellular telephone at another end thereof for operably connecting said second jack means to the selected cellular telephone;

said first and second jack means each connected to the cable lines to provide a configuration at each jack means for providing external signal connection paths as required to operably connect the selected cellular telephone with said interface means to select one pair of said hardware and firmware drivers having, respectively, the operating circuitry and commands necessary for controlling the selected cellular telephone to communicate signals over said cable lines in response to said selected pair of hardware and firmware drivers to permit the control of the selected cellular telephone.

27. A system as in claim 26 wherein said first and second jack means are multiple pin connectors.

28. A system as in claim 27 wherein at least one of said multiple pin connectors is a 25 pin D-type subminiature connector.

29. A system as in claim 19 wherein said interface means further includes memory means and said firmware drivers are retained in said memory means.

30. A system as in claim 19 wherein said memory means are non-volatile memory means.

31. A system for connecting a plurality of telephone network access devices, each responsive to device-specific command signals for its opeation, to an automotive electronics and communications system through a bus connector having a known universal signal format, comprising:

(a) interface means for processing data transferable over a selected telephone network access device, and operating in accord with an interface data control program, said interface means further having a plurality of hardware and firmware drivers having, respectively, the operating circuitry and commands necessary for controlling the selected telephone network access device, said interface data control program operating in accord with a specific signal path configuration to select a desired one pair of said hardware and firmware drivers, said interface control program further having universal bus connector hardware and firmware drivers having, respectively, the operating circuitry and commands necessary for operating in accord with signals received from the bus connector in the known universal signal format said interface means further comprises means for genrating and applying a signal to the bus connector that is useful for controlling other devices connected to the automotive electronics and communications system based upon the status of the selected telephone network access device and further includes means for generating a signal useful to mute a radio connected to the automotive electronics and communications system;

(b) first external signal path means connecting said interface means with the selected telephone network access device for communicating control signals therebetween for controlling and/or monitoring the operation of the selected telephone network access device, said first external command signal path means further having a selected signal path configuration chosen from a plurality of such configurations, each configuration adapted to select one pair of said hardware and firmware drivers having, respectively, the operating circuitry and commands necessary for controlling the selected telephone network access device to communicate command signals over said first external command signal path means in response to said selected pair of hardware and firmware drivers to permit the control of the selected telephone network access device;

(c) second external signal path means connecting said interface means and the bus connector for communicating signals therebetween.

32. A system as in claim 31 further including:

a docking station having a cradle member shaped for receiving and releasably retaining at least one of the plurality of telephone network access devices therein.

33. A system as in claim 31 wherein said interface means further comprises:

means for receiving a power signal from the bus connector and applying said power signal to the selected telephone network access device for charging the selected telephone network access device.

34. A system as in claim 31 wherein said docking station further comprises means for connecting the selected telephone network access device to an external antenna.

35. A system as in claim 31 wherein said first external signal path means comprises a cable having on a first end a first connector adapted to mate with an Input/Output port of said interface means and, on a second end, a second connector selected by a user and adapted to mate with the selected telephone network access device.

36. A system as in claim 35 wherein said first connector is a multiple pin connector.

37. A system as in claim 36 wherein said multiple pin connector is a 25 pin D-type subminiature connector.

38. A system as in claim 31 wherein said first external signal path means comprises a multi-line cable means having a first jack means at one end thereof compatible with an Input/Output port of said interface means and a second jack means compatible with the selected telephone network access device at another end thereof for operably connecting said second jack means to the selected telephone network access device;

said first and second jack means each connected to the cable lines to provide a configuration at each jack means for providing external signal connection paths as required to operably connect the selected telephone network access device with said interface means to select one pair of said hardware and firmware drivers having, respectively, the operating circuitry and commands necessary for controlling the selected telephone network access device to communicate signals over said cable lines in response to said selected pair of hardware and firmware drivers to permit the control of the selected telephone network access device.

39. A system as in claim 38 wherein said first and second jack means are multiple pin connectors.

40. A system as in claim 39 wherein at least one of said multiple pin connectors is a 25 pin D-type subminiature connector.

41. A system as in claim 31 wherein said interface means further includes memory means and said firmware drivers are retained in said memory means.

42. A system as in claim 31 wherein said memory means are non-volatile memory means.

* * * * *